United States Patent [19]
Post et al.

[11] Patent Number: 5,458,095
[45] Date of Patent: Oct. 17, 1995

[54] AIR PUMP-ASSISTED HYDROGEN/OXYGEN FUEL CELL FOR USE WITH INTERNAL COMBUSTION ENGINE

[75] Inventors: Donald R. Post, Stowe; Douglas C. Littlefield, Grand Isle, both of Vt.

[73] Assignee: Energy Reductions Systems, Inc., Vt.

[21] Appl. No.: 121,695

[22] Filed: Sep. 15, 1993

[51] Int. Cl.$^6$ .................................................. F02B 43/08
[52] U.S. Cl. ........................................ 123/3; 123/DIG. 12
[58] Field of Search ............................... 123/DIG. 12, 3, 123/527, 25 A, 1 A

[56] References Cited

U.S. PATENT DOCUMENTS

| | | |
|---|---|---|
| 3,311,097 | 3/1967 | Mittelstaedt . |
| 3,648,668 | 3/1972 | Pacheco ................................... 123/3 |
| 3,939,806 | 2/1976 | Bradley ................................... 123/3 |
| 4,003,345 | 1/1977 | Bradley ................................... 123/3 |
| 4,023,545 | 5/1977 | Mosher et al. . |
| 4,111,160 | 9/1978 | Talenti ............................ 123/DIG. 12 |
| 4,271,793 | 6/1981 | Valdespino ..................... 123/DIG. 12 |
| 4,368,696 | 1/1983 | Reinhardt . |
| 4,369,737 | 1/1983 | Sanders et al. . |
| 4,373,493 | 2/1983 | Welsh . |
| 4,442,801 | 4/1984 | Glynn et al. . |
| 4,763,610 | 8/1988 | Thomas . |
| 4,969,446 | 11/1990 | Olsson et al. ........................ 123/25 A |
| 5,105,773 | 4/1992 | Cunningham et al. .......... 123/DIG. 12 |
| 5,119,768 | 6/1992 | Russell ............................ 123/DIG. 12 |
| 5,143,025 | 9/1992 | Munday . |
| 5,231,954 | 8/1993 | Stowe . |
| 5,305,715 | 4/1994 | Nissley ............................ 123/DIG. 12 |

*Primary Examiner*—Henry C. Yuen
*Assistant Examiner*—Erick Solis
*Attorney, Agent, or Firm*—Cesari and McKenna

[57] ABSTRACT

An electrolysis cell for use in connection with a combustion engine, for generating hydrogen and oxygen gases which are added to the fuel delivery system as a supplement to the gasoline or other hydrocarbons burned therein. The hydrogen and oxygen gases are drawn out of the cell using an electric pump or other reliable source. The outlet side of the pump is connected to the air intake manifold using a hose having a terminating insert. The insert, typically formed from copper tube bent at an appropriate angle, insures that the hydrogen and oxygen gas outlet from the pump is in the same direction as the downstream airflow in the air intake manifold.

26 Claims, 4 Drawing Sheets

AIR PUMP-ASSISTED HYDROGEN/OXYGEN FUEL CELL FOR USE WITH INTERNAL COMBUSTION ENGINE

FIELD OF THE INVENTION

This invention relates generally to internal combustion engines having an auxiliary electrolytic cell which produces hydrogen and oxygen gas to enhance combustion efficiency.

BACKGROUND OF THE INVENTION

For quite some time now, there have been two major areas of concern with the millions of fossil fuel-driven internal combustion engines in use in automobiles, heating systems, power generators, and the like. A first problem is in the pollution of the atmosphere caused by the noxious gases generated as by-products of combustion. A second problem is in the increasing shortage of the fossil fuels on which such engines depend. A substantial amount of research has thus been done with the objective of increasing the efficiency of existing engines so as to use less fuel, as well as searching for alternative sources of energy.

It has been known for many years that hydrogen has numerous advantages over fossil fuels. For example, hydrogen has a potential heat energy almost three times greater than any other fuel. In addition, hydrogen burns cleanly, producing only water as a combustion by product. Hydrogen can also be made from water by several processes, one of the most convenient being simple electrolysis.

However, the substitution of hydrogen for gasoline and other fossil fuels in engines presents practical problems which have delayed commercial acceptance, probably for several reasons. Primary among these has probably been the fact that hydrogen stored in its pure form presents a high potential for explosion.

Therefore, a number of researchers have pursued the concept of providing an auxilliary hydrogen generating cell, adjacent the engine, which provides hydrogen to augment the combustion of fossil fuels. Such cells typically use the electrical energy from a battery in a vehicle engine and/or other nearby electrical source to provide hydrogen by the electrolysis of water.

It has been found that when hydrogen from such a cell is mixed with a hydrocarbon-based fuel such as gasoline in the combustion chamber of a conventional engine, there is a substantially improved combustion efficiency and a marked reduction of noxious emissions.

While this has confirmed certain theoretical advantages of hydrogen supplementation, it has not yet yielded a practical or reliable system. We have observed two shortcomings in particular with existing systems, which typically use two different methods to introduce the hydrogen and oxygen into the combustion cylinder. In the first type of system, most normally used with gasoline internal combustion engines such as in passenger vehicles and small trucks, a vacuum created in the positive crankcase valve (PCV) line is used to withdraw hydrogen and oxygen gas from the electrolytic cell into the intake air manifold of the engine.

In the second type of system, most commonly used with larger vehicles such as diesel trucks having an air compression system typically required to operate the brakes, the auxiliary compressed air source is used together with a Venturi to create a vacuum across an opening adjacent the electrolytic cell, thereby forcing the hydrogen and oxygen gas from the electrolytic cell into the intake air.

While there is nothing in particular which is theoretically wrong with either of these approaches, we have found that in practice neither method works reliably or predictably. For example, the PCV vacuum-operated system seems to work reliably with some vehicles but not in others. This may be due to susceptibility to the ambient humidity or temperature, the condition of the PCV system, cleanliness of the PCV valve itself, whether the PCV system has a vacuum leak or a vacuum leak exists somewhere else, the general extent to which the engine is "in tune", and other factors which contribute to the magnitude and quality of the vacuum force provided by the PCV system.

The performance of a compressed air delivery system is also unpredictable in practice, there being many potential sources of difficulties with such systems. For example, although the compressed air source typically available on an eighteen wheel diesel truck is first fed through an air filter, to ensure that oil is not mixed in with the compressed air, some oil contamination inevitably seems to occur regardless of how careful the operator is. Once oil is mixed in with the electrolytic process, it possibly combines with the hydrogen gas in some way to adversely affect the electrolytic process. In other instances, the required Venturi may clog or rust, or may be difficult to locate the required Venturi, air filter, and pressure regulator in a place which is not prone to damaging vibration. In a number of other instances, the air filter becomes clogged with oil to such a degree that little or no air reaches the Venturi, thereby limiting the Venturi's ability to transfer hydrogen and oxygen from the electrolytic cell to the intake air.

SUMMARY OF THE INVENTION

It is thus a general object of this invention to provide an improved hydrogen supplementation system which overcomes the above-mentioned disadvantages of previously known systems.

It is also a general object of this invention to provide a hydrogen supplementation system which decreases air pollution and increases fuel efficiency, while at the same time being inexpensive, readily installed, reliable, and predictable, and which does not require modification of existing emission control systems or the use of auxiliary compressed air source.

More particularly, it is an object of the invention to use a reliable and repeatable means to extract the hydrogen and oxygen from an auxiliary electrolysis cell, such as an electrically operated pump.

In brief summary, the invention is a hydrogen supplementation system for an engine, and includes a hydrogen gas source, for example an electrolysis cell which generates hydrogen gas, and a pump connected to the electrolysis cell to draw the hydrogen gas out of the cell and into an engine air intake port. In particular, the electrolysis cell contains an aqueous electrolyte solution partially filling the cell and leaving a gas accumulation zone in the cell above the electrolyte level; electrodes disposed within the cell and at least partially immersed in the electrolyte solution, the electrodes being electrically connected to a battery or other source of electrical potential in said engine, whereby hydrogen and oxygen are generated from the water in;said electrolyte; a hydrogen/oxygen delivery line connected at one end to the gas accumulation zone in the electrolysis cell and at the other end to a vacuum inlet port of a pump; and the outlet port of the pump being connected to an intake air manifold of the internal combustion engine, whereby hydrogen and oxygen generated in the electrolysis cell are withdrawn by the electric pump and fed into the intake air manifold.

The pump is preferably an electric pump which is powered by being connected to a nearby vehicle battery or other reliable source of electric potential.

In the preferred embodiment, the outlet side of the pump is connected to the air intake using a hose having a terminating insert. The insert, typically formed from copper tube bent at an approximately degree angle, insures that the hydrogen and oxygen gas outlet from the pump is in the same direction as the downstream airflow in the air intake manifold.

Additionally, we have found that a simple low-pressure pop-up relief valve positioned within the electrolysis cylinder is set to open with a fairly low pressure such as one quarter pound/square inch is reached, adequately prevents any hazard of explosion in the electrolysis cell.

The invention provides a reliable improvement in fuel efficiency as well as a reduction in noxious gases emitting from the engine.

BRIEF DESCRIPTION OF THE DRAWINGS

In order that the invention may be better understood, a description of the invention is provided herein with reference to the general concepts and an illustrative embodiment thereof, wherein:

FIG. 2 is a an exploded perspective view of the electrolysis cell, indicating the location of electrodes, gas accumulation zone, gas delivery line, and the like;

DESCRIPTION OF THE PREFERRED EMBODIMENTS

Figure 1:
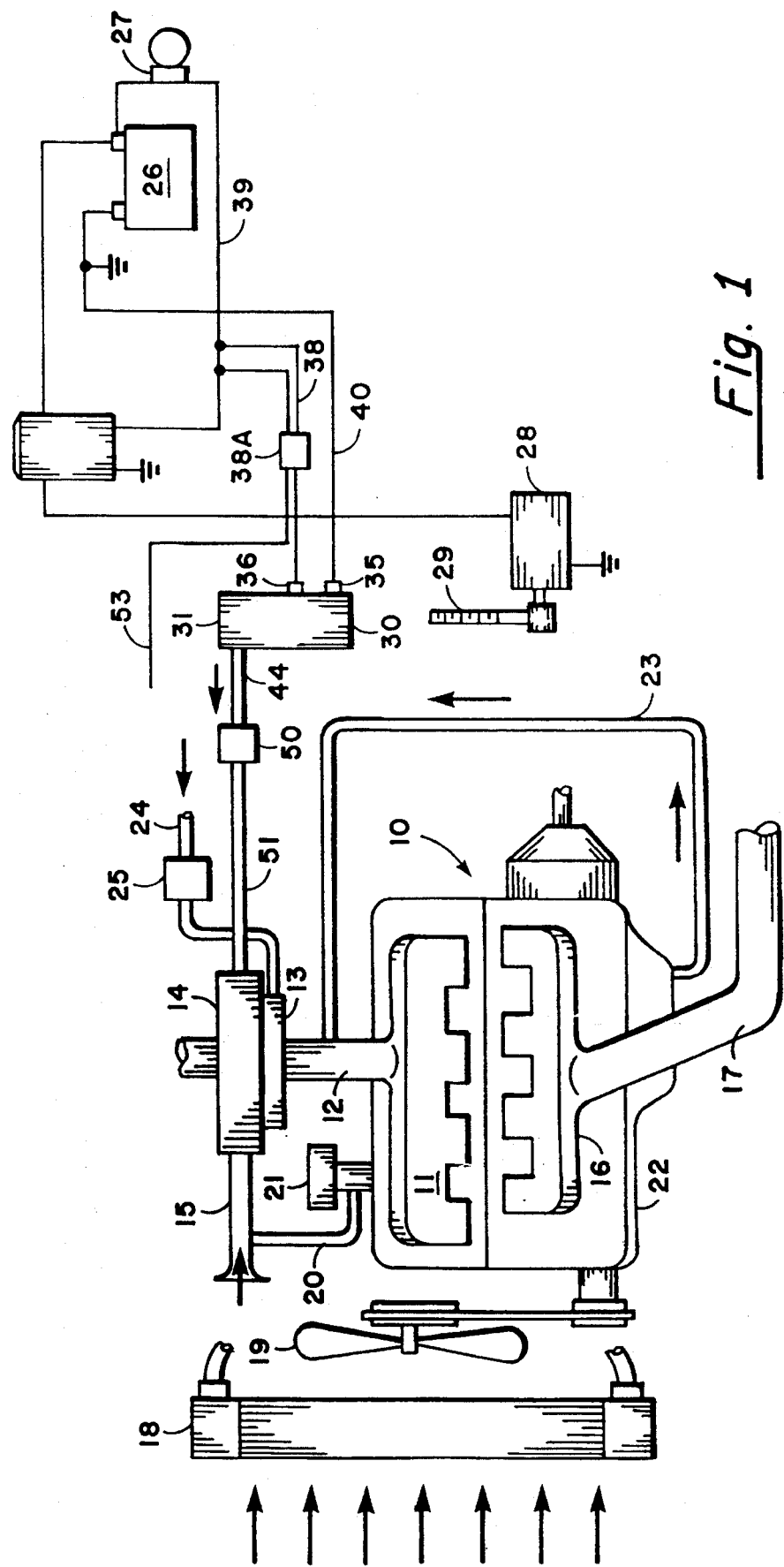
FIG. 1 is a diagrammatic view of an automobile engine showing the connection of electrolysis cell and pump of the present invention.

Referring now to FIG. 1, the use of the invention in connection with a carburated internal combustion engine for use in a vehicle will be described first. An internal combustion engine in which fuel is ignited by spark plugs is shown as including an engine block represented at 10. As is conventional, the engine block 10 includes a fuel intake manifold 11 having a main stem 12, upon which is mounted a carburetor 13 for a hydrocarbon fuel such as gasoline. Above the carburetor 13 is an air filter 14 having a main air intake port 15. The engine block 10 also has an exhaust manifold 16 from which extends an exhaust pipe 17, as well as a cooling system including a radiator 18 and a fan 19. A fuel tank (not shown) supplies gasoline or other fuel through a line 24 via a fuel pump 25, which is then introduced into the carburetor 13.

The engine also includes a conventional positive crankcase ventilation (PCV) system, in which a source of air is drawn from the air intake 15 through a tube 20 into the oil filler cap assembly 21, from where the air flows past rocker arms and push rods (not shown) into the crankcase 22. The air and accumulated crankcase gases then enter a spring-loaded regulator valve (PCV valve, not shown), through a crankcase vent hose tube 23 to the main stem 12 of the intake manifold 11.

The engine also includes a battery 26 as a source of electric potential, together with associated wiring and switching. An ignition key switch 27 is adapted to supply energy from the battery 26 to a cranking motor 28 to activate a flywheel 29, which is turned over to start the engine.

The invention includes an electrolysis canister or cell 30, which provides hydrogen and oxygen gas, and a pump 50 to draw the hydrogen and oxygen gas produced thereby from the cell 30 into the air intake 11 of the engine.

More particularly, the cell 30 includes a waterproof cylindrical casing 31, made of a chemically and electrically inert material, such as high impact plastic, tempered glass, glazed lava, or the like. The cell 30 is not restricted to a cylindrical shape, but may have any suitable configuration, including square, rectangular, or custom fitted, depending upon the most convenient location for its installation.

The cell 30 also includes a cathode 35 and anode 36. A first wire 38 electrically connects the anode 36, through a fuse box 38A, to a wire 39. The wire 39 leads through an ignition key switch 27 to connect with the positive terminal of the battery 26.

A second wire 40 is in electrical contact with cathode 35 and leads to the negative ground terminal of the battery 26, or vehicle frame, if the electrical system is grounded.

Upon applying an electric current to the cathode and anode 35 and 36, an electrolytic solution within the cell 30 generates hydrogen and oxygen gases.

The hydrogen and oxygen gases produced in the cell 30 are conducted from the cell 30 to the intake manifold 11 by the pump 50.

In the preferred arrangement, the pump 50 draws the gases out of the cell 30 through a gas outlet line 44 into a hydrogen gas flow inlet line 51. The inlet line 51 is connected in some convenient manner to the air intake of the engine, such as after the air filter 14, at the main stem 12, or in some other convenient, low operating pressure position, so that the gases are presented to the intake manifold 11. In a turbocharged engine, for example, the inlet line 51 is positioned before the turbocharger. Alternatively, the pump 50 can be arranged to pump ambient air into the cell 30, with the gas outlet line 44 connected to the inlet line 51 of the engine. The resulting air pressure then forces the gas from the cell into the air intake.

Preferably, the pump 50 is powered by a reliable and convenient source of electric energy, such as the battery 26. In such an instance, a pump supply voltage 53 is electrically connected to the battery 26 through the fuse box 38A to the wire 39, and the pump 50 is suitably grounded.

Continuous duty cycle-type pumps 50 compatible with the operating conditions typically expect? d within the engine compartments of automobiles, trucks, and other places where internal combustion engines are located are readily available. One particular pump uses one or more so-called duck bill valves, which insure that at any instant in time, the inlet port or outlet port are open, but not both at the same time, to assist in arresting back pressure through the system such as during an engine backfire.

Although a carburated, gasoline powered engine is shown in FIG. 1, it should be understood that the invention is equally applicable to other types of internal combustion engines such as diesels, fuel-injected engines, and the like. It should also be understood that the invention can be used with other than vehicle engines such as heating plants, generators, and the like, although some adaptations may be necessary in other applications. For example, in a residential oil furnace, the convenient electric energy source would typically be a 120 volt alternating current (AC) outlet, rather than a battery 26, and the air exhaust would be to a pipe or a chimney.

Figure 2:
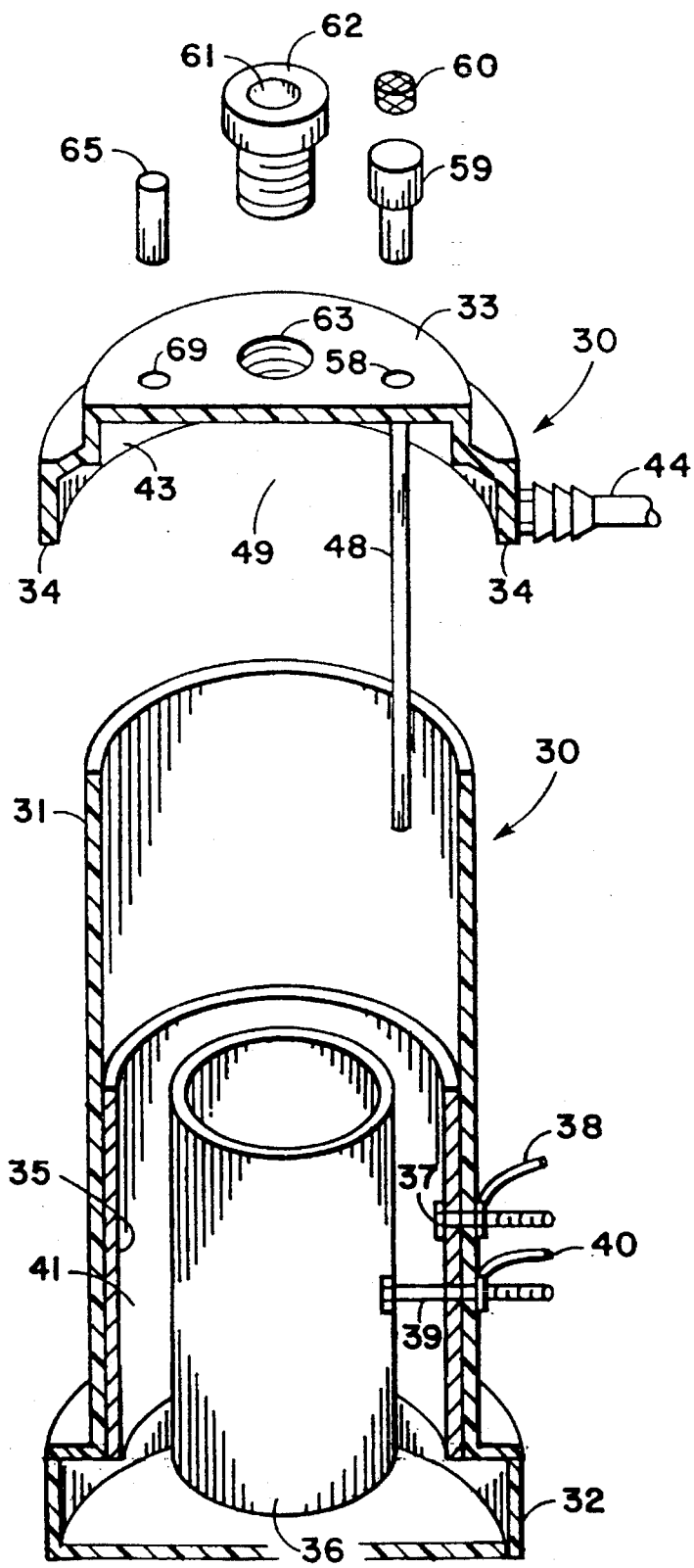

Referring now to FIG. 2, one embodiment of the electrolysis cell 30 will be described in greater detail. The cell 30 includes a casing 31 having a bottom cap 32 and a top cap 33 which are securely adhered to the casing 31 in any suitable way.

One of the caps 32 or 33 should be removable, such as a screw-on cap, to permit cleaning and inspection of the interior of the cell 30.

The cathode 35 is formed as a stainless steel sleeve or core 35, which may be formed as an inner liner for the casing 31.

The anode 36, also formed as a cylindrical stainless steel core, is secured concentrically of the cathode cylinder 35. The anode 36 is supported by a pair of stainless steel bolts 37 and 39 secured to the casing 31. The bolt 37 is insulated from contact with cathode 35 but is electrically connected to anode 36 at one end and to electrical wire 38 at the other end. The other bolt 39 is insulated from electrical contact with both cathode 35 and anode 36, and acts simply as a support member for holding anode 36 in place.

The electrolysis cell 30 contains an aqueous electrolyte solution 41, which is normally filled to a level 42 above the top of cathode 35 and anode 36. As is well known, when an electric current is applied thereto and passes through the electrolyte solution between the electrodes 35 and 36, the water in the solution is decomposed to produce hydrogen and oxygen gas, which rises upwardly above the electrolyte level 42 and collects in a gas accumulation zone 43.

Hydrogen and oxygen which reach the gas accumulation zone 45 are thus drawn off by the pump 50 (not shown in FIG. 2) through the gas outlet line 44, through a gas outlet port 45. The gas outlet port 45 is provided typically by a suitable hose barb 46 which mates with an opening in the top cap 33.

An air cooling tube 48 extends from an opening 58 in the top cap 33 and terminates at a point below the surface 42 of the aqueous electrolyte solution 41. The cooling tube assists in controlling the temperature of the solution 41 and also allows an additional supply of ambient air to be drawn into the solution 41 to assist in liberation of hydrogen and oxygen gas bubbles from the electrodes. In the case where the pump 80 is arranged before the cell 30, the air cooling tube 48 serves as an air intake port for the cell 30.

An adjustable needle valve 59 is preferably inserted into the end of the cooling tube 48, to prevent overheating of the electrolytic cell 30 and to permit emission control mechanics to mix air with the accumulated hydrogen and oxygen gases in such proportions as may be needed to conform the engine operation to existing emission control regulations.

An air filter 60 is also preferably provided in the cooling tube 48 and/or as part of the needle valve assembly to prevent atmospheric contaminants such as road dirt from entering the cell 30 and adversely affecting its operation.

A removable threaded fill plug 61 is inserted into a threaded opening 63 in the top cap 33. The fill plug 61, which typically includes a sight lens 62 therein, permits inspection of the fluid level 42 within the cell 30. When the electrolytic cell needs to be replenished, which in practice has been found to be on the order of once every one to two thousand miles, the plug 61 is easily removed, and water and/or additional electrolytic solution can be added.

A pressure relief valve 65 is also mounted within another opening 64 in the top cap 33. The valve 65 allows for the escape of internal gas pressure within the cell 30. We have found that a fairly low pressure relief setting, such as one-quarter pound per square inch, provides adequate protection against any possible explosion hazard.

The size of the cell 30 typically varies according to the size of the engine to which it is attached. For example, for automobiles having a four cylinder engine, a recommended size for the canister 31 is about three and one-half inches in diameter, with a height of about eight to twelve inches. Diesel trucks typically use an eight and one-half by twenty four to thirty-six inch size.

One type of electrolytic solution can be made by mixing small quantities of phosphoric acid (food grade), sodium perborate (to supply extra oxygen), and acetanilide as a stabilizer, in deionized or distilled water. Additives are often desired or required. For example, in colder climates, it has been found that a mixture of propylene glycol should be added to the electrolyte 41 to prevent it from freezing.

The quantities of these chemicals may be varied between rather wide ranges, the objective being to provide reasonable flow of current between the two electrodes. We have found that for reliable operation in a small four-cylinder engine, the cell 30 should be provided with enough electrolyte to draw at least 4 amperes of current when in the cold state.

For further details of the contents of the preferred electrolytic solutions and the construction and operation of one particular cell 30, refer to U.S. Pat. No. 5,231,954, issued Aug. 3, 1993, which is hereby incorporated by reference. Electrolytic solutions other than those described in that patent, and indeed, electrolytic cells 30 which are quite different in structure and, operation from the cell 30 shown in FIG. 2 may be used as well, as long as sufficient quantities of hydrogen and oxygen are produced.

We have found the pump 50 need not pull a particularly strong vacuum. For example, with the smaller sized cell 30 for four cylinder automobiles, one such pump 50 should be capable of maintaining at least approximately 2.8 liters per minute (l/min) flow against zero pressure, 1.6 l/min against one-half pound per square inch (psi), and 0.5 l/min against one psi, terminating at 0 l/min at approximately 3 psi. Another pump 50, suitable for use with larger engines, is capable of maintaining 5.9 l/min against 0 psi, 3.3 l/min against 0.5 psi, and 2.5 l/min against 1 psi, terminating at 0 l/min at approximately 4 psi.

Figure 3:
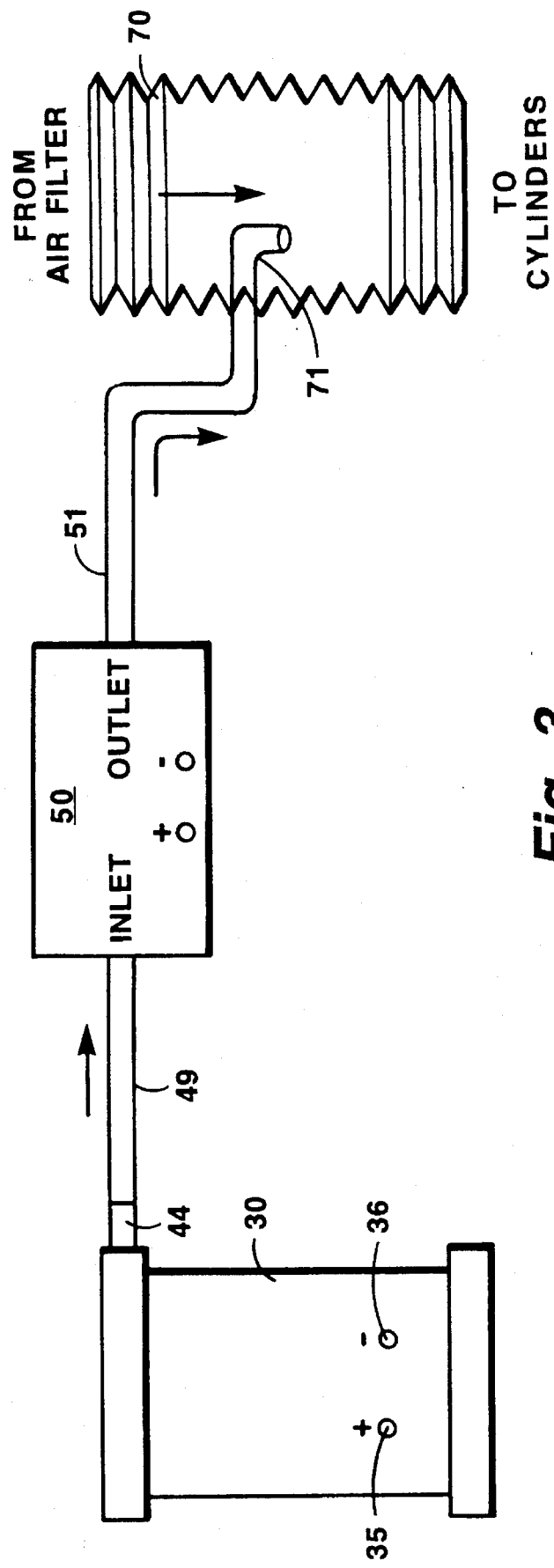
FIG. 3 s a diagrammatic view of the electrolysis cell, air pump, and air intake hose in one configuration.

FIG. 3 is a schematic view of the pump 50 and its preferred use with a modern fuel injected automobile engine, such as the type which has an air scoop or dam mounted near the front of the vehicle, which is in turn connected to an air filter to provide ambient air to an air intake manifold 11 (FIG. 1 ).

Upon application of electric potential to the cathode and anode 35 and 36, the cell 30 provides hydrogen and oxygen gas via the port 44 and hose 49 to the pump 50. The pump 50 thus creates a vacuum, causing hydrogen and oxygen to be drawn from the cell 30 through the pump 50, to the hydrogen gas inlet line 51.

The inlet line 51 is then secured to an air intake hose 70, preferably a intake hose which is down stream of the air filter (not shown in FIG. 3). An L-shaped insert 71, formed of a piece of copper tubing or other suitable heat-resistant material bent at an appropriate angle, is placed within the end of the inlet line 51, and protrudes into the interior of the intake hose 70. The insert 71 insures that the outflow from the pump is facing downstream, in the same direction as the air intake. This helps to insure that the pump 50 is not required to work against the force of the incoming air.

Figure 4:
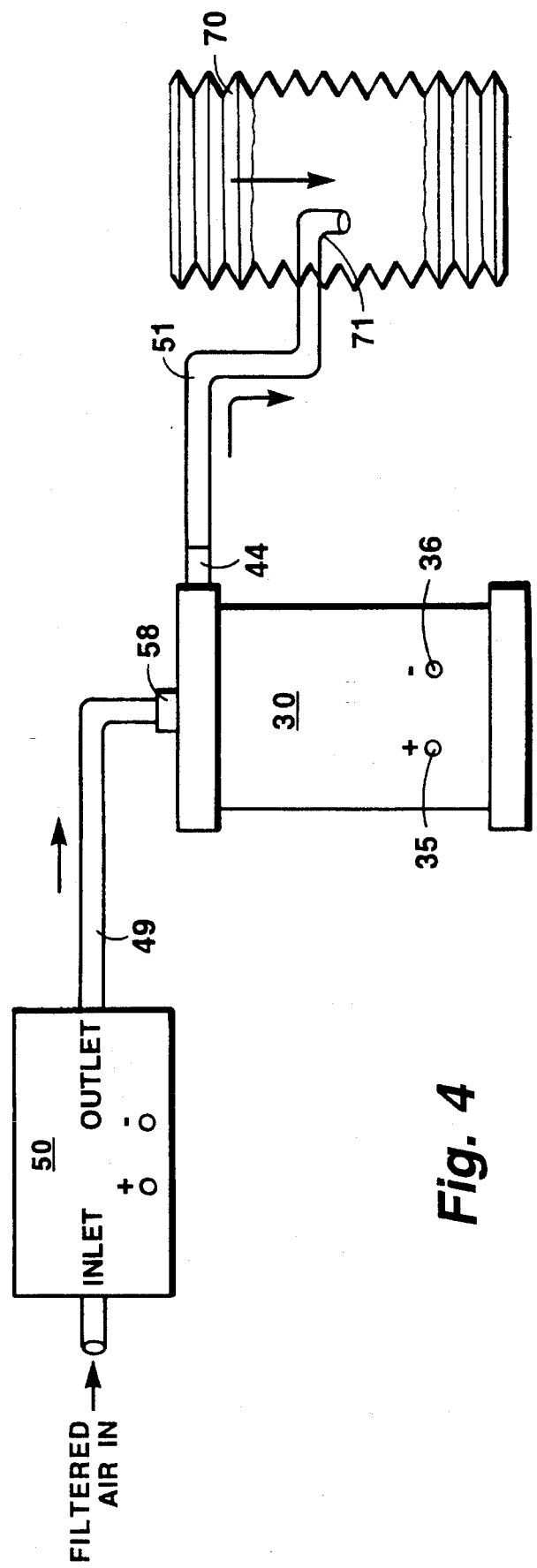
FIG. 4 is a similar diagramatic view of the pump electrolysis cell, and air intake hose in another configuration.

As previously described, the position of the cell 30 and pump 50 may be reversed, with cell 30 having an inlet port (not shown) and being placed between the pump 50 and hydrogen gas inlet line 51. As shown in FIG. 4, the pump 50 may be arranged to draw ambient air to its inlet port, creating a positive air pressure on the cell 30, thereby causing hydrogen and oxygen gas to be forced into the inlet line 51. The outlet of the pump 50 is connected to the opening 58 in this configuration.

The invention provides a number of features which are significant in terms of effectiveness in the field of fuel consumption reduction and emission control.

Firstly, the invention is more reliable than prior devices, and provides a predictable amount of oxygen and hydrogen to augment the combustion of fossil fuels.

The invention may be used with any type of internal combustion engine, not just those equipped with PCV emission control systems, and not just those engines which are used in applications where a source of compressed air is readily available, such as a diesel truck.

The use of an electric air pump makes the hydrogen delivery system independent of other vehicle systems, such as the PCV or other emission control systems, or air compressors.

The operation of the system is easily confirmed. If the cell 30 is drawing the desired number of amperes, and the pump 50 is operating, savings in fuel and reduced emissions expected of the cell 30 will result.

In one test of the effectiveness of the invention, a three by eight inch cell 30 was placed in a 1987 Honda Accord LXi. The prior art technique of using the PCV system to force hydrogen gas from the cell 30 was tried first. No improvement in gasoline mileage was observable, despite trying different amperages in the cell 30, different sized inlet lines 51, and different sized restrictions on the opening 58 for the tube 48. Upon installation of the pump 50 in the manner shown in FIGS. 1 and 3, an immediate and sustained 13% increase in mileage was observed.

Although the present invention has been disclosed in connection with certain preferred embodiments thereof, variations and modifications may be made by those skilled in the art without departing from the principles of the invention. All of these variations and modifications are considered to be within the true spirit and scope of the present invention as disclosed in the foregoing description and defined by the claims.

What is claimed is:

1. In a combustion engine including combustion cylinders; a fuel delivery means for mixing a primary fuel with air and for delivering said primary fuel/air mixture through an intake manifold to said combustion cylinders; and a source of electrical potential energized by the operation of said engine; the improvement to said engine comprising:

an electrolysis cell containing an aqueous electrolyte solution and at least two electrodes disposed within said electrolysis cell each at least partially immersed in said electrolyte solution, said electrodes being electrically connected to opposite polarities of said source of electrical potential, whereby hydrogen and oxygen are generated from the water in the electrolyte solution and are collected in a gas accumulation zone formed in said electrolysis cell, and wherein said electrolysis cell has an air inlet cooling robe which includes art air filter, and an outlet port, wherein air passing through said air filter enters said gas accumulation zone, and gas exiting said zone exits through said outlet port; and a pump, comprising a pump inlet port which receives gas exiting said outlet port and pumps the gas through a pump outlet port into the intake manifold of the engine.

2. The apparatus of claim 1 wherein said pump is an electric pump operated by said source of electric potential in said engine.

3. The apparatus of claim 1 wherein the outlet side of the pump is connected to the intake manifold using a terminating hose insert, the hose insert positioned with respect to the direction of air intake to insure that outflow from the pump is in the same direction as the inlet airflow to the engine.

4. The apparatus of claim 1 wherein said air inlet cooling tube includes an air adjustment needle valve to control the amount of ambient air introduced into said gas accumulation zone through said air inlet cooling tube.

5. The apparatus of claim 1 wherein a pressure relief valve is positioned in the electrolysis cell.

6. In a combustion engine including combustion cylinders; a fuel delivery means for mixing fuel with air and for delivering said fuel/air mixture through an intake manifold to said combustion cylinders; and a source of electrical potential energized by the operation of said engine; the improvement to said engine comprising:

an electrolysis cell with an aqueous electrolyte solution partially filling said electrolysis cell, said electrolysis cell containing at least two electrodes disposed within said electrolysis cell and at least partially immersed in electrolyte solution, the electrodes being electrically connected to opposite polarities of said source of electrical potential, whereby hydrogen and oxygen are generated from the water in the electrolyte solution and are collected in a gas accumulation zone formed in said electrolysis cell, and wherein said electrolysis cell has an inlet port and an outlet port;

a pump, arranged to cause gas formed in the gas accumulation zone to be pumped into the air intake manifold of the engine, said pump having an inlet port and an outlet port, and wherein the inlet port of said pump is connected to receive ambient air through an air filtration device and the outlet port of said pump is connected to the air inlet port of said electrolysis cell, and wherein the outlet port of said electrolysis cell is connected to said air intake manifold.

7. A combustion engine comprising: combustion cylinders; associated pistons, crankshaft and crankcase; a hydrocarbon fuel tank containing a primary fuel; primary fuel pumping means, for pumping said primary fuel; primary fuel mixing means for mixing said primary fuel with air and delivering said primary fuel/air mixture through an intake manifold to said combustion cylinders; and a battery energized by the operation of said engine; and a supplemental hydrogen fuel source comprising an electrolysis cell comprising a body;

an aqueous electrolyte solution partially filling said body of said electrolysis cell and leaving a gas accumulation zone there above in said electrolysis cell;

an inner stainless steel cylindrical electrode and an outer stainless steel cylindrical electrode concentrically disposed with respect to each other within said electrolysis cell body and at least partially immersed in said electrolyte solution, said inner electrode being electrically connected to the positive side of said battery through an ignition key switch, and said outer electrode being connected to the negative side of said battery, whereby when said ignition key switch is turned to an on position, hydrogen and oxygen are generated from said electrolyte solution and are collected in said gas accumulation zone;

a cooling air intake opening in the body of said electrolysis cell, having an air filter disposed therein, wherein atmospheric air passes through said air intake and said air filter on its way into said gas accumulation zone, the size of said opening being controlled by an air adjustment valve;

an outlet port through which gases in said accumulation zone exit said electrolysis cell;

an electric pump having electrical terminals to receive electric power and having inlet and outlet ports, the terminals of the electric pump being connected to the positive and negative sides of said battery;

a first hydrogen/oxygen delivery line connected at one end through the body of said electrolysis cell into said gas accumulation zone in said electrolysis cell and connected at the other end to said inlet port of said electric pump;

a second hydrogen/oxygen delivery line connected at one end to the outlet of said electric pump and connected at the other end to said intake manifold, whereby hydrogen and oxygen generated in said supplemental hydrogen fuel source are withdrawn by said pump and fed into said intake manifold.

8. The apparatus of claim 7 wherein the electrolyte is in communication with the atmosphere through an air cooling tube.

9. The apparatus of claim 8 wherein said cooling tube includes an air adjustment needle valve.

10. The apparatus of claim 7 wherein a pressure relief valve is positioned on the electrolysis cell.

11. The apparatus of claim 7 wherein the outlet port of said electrolysis cell is connected to the air intake manifold using a terminating hose insert, the hose insert positioned with respect to the direction of air intake to insure that outflow is in the same direction as the inlet airflow to the engine.

12. The apparatus of claim 7 wherein the outlet port of said electrolysis cell is connected to said intake manifold at a position adjacent a carburetor air filter assembly positioned above a carburetor.

13. The apparatus of claim 7 wherein said engine has an air filter and the outlet port of said electrolysis cell is connected to said intake manifold at an air intake located after the carburetor air filter.

14. The apparatus of claim 7 wherein the outlet port of said electrolysis cell is connected through a fitting adapted to said intake manifold.

15. In a combustion engine including combustion cylinders; a fuel delivery means for mixing fuel with air and for delivering said fuel/air mixture through an intake manifold to said combustion cylinders; and a source of electrical potential energized by the operation of said engine; the improvement to said engine comprising:

an electrolysis cell with an aqueous electrolyte solution partially filling said electrolysis cell, said electrolysis cell containing at least two electrodes disposed within said electrolysis cell and at least partially immersed in electrolyte solution, the electrodes being electrically connected to opposite polarities of said source of electrical potential, whereby hydrogen and oxygen are generated from the water in the electrolyte solution and are collected in a gas accumulation zone formed in said electrolysis cell;

a pump, arranged to cause gas formed in the gas accumulation zone to be pumped into the air intake manifold of the engine; and an air filtration device, arranged to cause ambient air to be pumped together with the gas formed in the gas accumulation zone into the air intake manifold of the engine.

16. The apparatus of claim 15 wherein said pump is an electric pump operated by said source of electric potential in said engine.

17. The apparatus of claim 15 wherein the electrolyte is in communication with the atmosphere through an air cooling tube.

18. The apparatus of claim 17 wherein said cooling tube includes an air adjustment needle valve.

19. The apparatus of claim 15 wherein a pressure relief valve is positioned on the electrolysis cell.

20. The apparatus of claim 15 wherein said electrolysis cell has an inlet port and an outlet port and said pump has an inlet port and an outlet port, and wherein the inlet port of said pump is connected to receive ambient air through an air filtration device and the outlet port of said pump is connected to the air inlet port of said electrolysis cell, and wherein the outlet port of said electrolysis cell is connected to said air intake manifold.

21. The apparatus of claim 20 wherein the outlet port of said electrolysis cell is connected to the air intake manifold using a terminating hose insert, the hose insert positioned with respect to the direction of air intake to insure that outflow is in the same direction as the inlet airflow to the engine.

22. The apparatus of claim 20 wherein the outlet port of said electrolysis cell is connected to said intake manifold at a position adjacent an air filter assembly positioned above a carburetor.

23. The apparatus of claim 20 wherein said engine has an air filter and the outlet port of said electrolysis cell is connected to said intake manifold at an air intake hose located after the air filter.

24. The apparatus of claim 20 wherein the outlet port of said electrolysis cell is connected is through a fitting adapted to said intake manifold.

25. The apparatus of claim 15 wherein said pump includes an inlet and an outlet, wherein said inlet receives hydrogen and oxygen from said gas accumulation zone and pumps the hydrogen and oxygen into the air intake manifold.

26. The apparatus of claim 15 wherein said filtration device is located in an ambient air inlet line which provides filtered ambient air to said gas accumulation zone.

* * * * *